United States Patent [19]
Reedy et al.

[11] Patent Number: 5,472,987
[45] Date of Patent: Dec. 5, 1995

[54] SURFACTANT COMPOSITION FOR FLEXIBLE POLYURETHANE FOAM

[75] Inventors: James D. Reedy, Marietta, Ohio; Richard T. Robertson, Pennsboro, W. Va.

[73] Assignee: OSi Specialties, Inc., Danbury, Conn.

[21] Appl. No.: 720,647

[22] Filed: Jun. 25, 1991

[51] Int. Cl.$^6$ .................................................. B01F 17/00
[52] U.S. Cl. ........................ 521/106; 521/107; 521/108; 521/112; 252/351; 252/356; 252/353; 252/357
[58] Field of Search ..................................... 521/106, 107, 521/108, 112; 252/351, 356, 353, 357

[56] References Cited

U.S. PATENT DOCUMENTS

| | | | |
|---|---|---|---|
| 3,562,786 | 2/1971 | Bailey et al. | 252/137 |
| 3,594,334 | 7/1971 | Marlin | 260/2.5 |
| 3,669,913 | 6/1972 | Morehouse | 260/2.5 AH |
| 3,821,122 | 6/1974 | Walsh et al. | 521/112 |
| 4,060,439 | 11/1977 | Rosemund et al. | 156/78 |
| 4,088,615 | 5/1978 | Sandner et al. | 260/2.5 AM |
| 4,107,069 | 8/1978 | Keller et al. | 252/182 |
| 4,146,498 | 3/1979 | Sandner et al. | 252/182 |
| 4,184,022 | 1/1980 | Lawyer | 521/118 |
| 4,686,240 | 8/1987 | Bailey, Jr. et al. | 521/103 |
| 4,751,251 | 6/1988 | Thornsberry | 521/112 |

FOREIGN PATENT DOCUMENTS 0314903  5/1989  European Pat. Off. .

OTHER PUBLICATIONS

G. Oertel, *Polyurethane Handbook: Chemistry–Raw Material–Processing–Applications–Properties*, 1985, p. 99.
Abstract of U.S. Pat. No. 3,351,417.
Abstract of U.S. Pat. No. 3,513,183.
Chem. Abstract 109:39033g.
Chem. Abstract 103(18):143324q.
Chem. Abstract 88(14):90441p.
Derwent Abstract DT 2615–804 (corresponds to Chem. Abstract 88:90441p).
Chem. Abstract 87(24):185851r.
Derwent Abstract of EP–63930.
Computer print–out of search, Mar. 6, 1991.
Computer print–out of ACS Chemical Abstracts search.

*Primary Examiner*—James J. Seidleck
*Assistant Examiner*—R. F. Johnson
*Attorney, Agent, or Firm*—Andrew S. Reiskind

[57] ABSTRACT

Surfactants for conventional flexible polyurethane foam may be improved by the addition of a minor amount of an organic acid salt.

26 Claims, No Drawings

SURFACTANT COMPOSITION FOR FLEXIBLE POLYURETHANE FOAM

FIELD OF THE INVENTION

This invention relates to polysiloxane-polyether surfactants for polyurethane foam manufacture, and more particularly, to polysiloxane-polyether surfactant compositions which contain a minor amount of a salt of an organic acid, to aid them in achieving and maintaining a high level of effectiveness.

BACKGROUND OF THE INVENTION

Polyurethane foams are materials made by reaction of a polyol and an organic polyisocyanate in the presence of a catalyst, a blowing agent, and a foam-stabilizing surfactant; often, other additives are included as well.

A wide variety of each of these reagents is known, and foams having vastly differing properties may be produced by appropriate selection of particular combinations of ingredients. Thus, for example, foam formulations based on polyester polyols, polyether polyols, and mixtures thereof are known, as are formulations which produce rigid foams, conventional flexible foams, and high resilience foams.

The surfactants which are used in each of the several types of foam are generally siloxane-polyether block copolymers which differ from one another depending upon the particular types of compositions in which they are to be employed. Such siloxane polyether copolymers are of two classes—"hydrolyzable" siloxane-polyether block copolymers in which the polyether blocks are attached to the siloxane blocks via Si—O—C linkages, and "nonhydrolyzable" siloxane-polyether block copolymers in which the polyether blocks are attached to the siloxane blocks via Si—C linkages.

Siloxane-polyether block copolymer surfactants are very complex mixtures of structures, the precise compositional nature of which are not readily definable. For a given nominal "nonhydrolyzable" siloxane-polyether copolymer the siloxane block has relatively broad molecular weight distribution. Within the siloxane block molecular weight distribution there are sub-distributions based on the number and spacing of the attachment sites for the polyether blocks. The polyethers which are attached to the siloxane are also complex distributions of various molecular species, and frequently are blends of polyethers of different molecular weights and polarities.

The platinum catalyst used to promote hydrosilylation, a reaction which is commonly employed to prepare such silicone-polyether copolymers by addition of an Si—H moiety across the double bond of an allyl-started polyether, is also poorly defined. Some evidence suggests this catalyst is homogeneous and some suggests that it is heterogeneous. Trace impurities in the silicone and allyl-containing polyether reactants have a dramatic impact on the hydrosilylation reaction. When the reactants are relatively free from platinum inhibitors the hydrosilylation is rapid and the order in which the polyethers react appears to be substantially random. The presence of certain trace impurities appears to affect both the reaction rate and the selectivity. There are also side reactions such as dehydrocondensation, which causes the loss of polyether attachment sites and crosslinks the siloxanes.

Thus, the potential exists for considerable structural variability in the product surfactant if the proper parameters are not precisely controlled during its preparation. The extent to which the above variables affect the quality and consistency of the resulting siloxane-polyether copolymer surfactants is very dependent upon the nominal structure of the particular surfactant being produced, and the way in which the reactants are prepared and purified.

For each surfactant of a given nominal structure and made by a given process there is a practical optimum "ceiling performance" level. Most of the lots of the surfactant will perform in a given urethane foam at or near this level, but some preparations of the material, ostensibly identical, will perform somewhat less well. For best performance and consistency of the surfactant, it would be very desirable to have the means to modify surfactants to improve their performance. Prior to the present invention, however, such means for improving the performance of siloxane-polyether copolymer surfactants intended for use in the manufacture of conventional flexible polyurethane foam apparently have not been disclosed in the technical or patent literature, and do not appear to be known to the art.

It has been known for a number of years that organic sulfonate or carboxylate salts can be used in combination with certain silicone surfactants for rigid polyurethane foam and polyester foam. In some cases these organics were used as the sole surfactant. The ability of organic sulfonate or carboxylate salts to function as co-surfactants or as the exclusive surfactant in these two classes of foam has been commonly thought to be due to the high polarity of polyols used for rigid and polyester foams (see U.S. Pat. No. 3,594,334 for discussion on surface tension lowering).

Anionic organic surfactants do not function as surfactants in conventional flexible polyurethane foam. It is postulated that this is because they are not sufficiently surface active to adequately reduce the surface tension of the less polar polyethers used for conventional flexible polyurethane foam.

U.S. Pat. No. 4,751,251 discloses a surfactant composition for rigid polyurethane and rigid polyisocyanurate foams, this surfactant composition including from about 15 to about 50 percent each of (1) an organic surfactant, (2) a siloxane-polyoxyalkylene surfactant, and (3) water, alcohol of 1 to 3 carbon atoms, or a mixture thereof.

U.S. Pat. No. 4,686,240 deals with a process for producing conventional flexible foams and high resilience polyurethane foams using foam modifiers which are alkali metal or alkaline earth metal salts of Brönsted acids having $pK_a$ values greater than one. Among the several classes of foam modifiers disclosed are salts of alkali and alkaline earth metals and carboxylic acids. These foam modifiers are used with conventional silicone-polyether surfactants in foam preparations. The anions of the salts can be attached to a polyol, a polyether, a silicone-polyether copolymer, or a hydrocarbon. Generally, the level of the foam modifier employed is a substantial fraction of the sum of the foam modifier and the surfactant. In the foam preparation process, the required ingredients are mixed and immediately foamed. The '240 patent excludes aryl sulfonate salts as foam modifiers, because the pKa of the parent sulfonic acid is less than 1, which is the minimum value permitted under this patent. There is no indication that the foam modifiers are used in conjunction with the surfactants.

U.S. Pat. No. 4,184,022 discloses rigid polyisocyanurate foam based on a carbocyclic ester polyol and a resole polyether polyol, and employing a catalyst which includes an alkali metal salt of a carboxylic acid. The foam-forming composition may also include surfactants. Carboxylate salts such as these are commonly used as catalysts in isocyanurate foams.

U.S. Pat. No. 4,146,498 deals with additives for improving certain properties of polyester urethane foam. The foam-forming compositions contain an organic surfactant and may also include a silicone surfactant. The specification indicates that both the silicone surfactant and the organic surfactant are employed in amounts up to about 5 parts per hundred of the polyol reactant.

U.S. Pat. No. 4,107,069 deals with precursors for rigid polyurethane foams, these precursors containing both alkali metal salts of carboxylic acids and silicone surfactants.

U.S. Pat. No. 4,088,615 discloses the use of organic surfactant and silicone surfactant in polyester urethane foams. These materials are employed in approximately the same amounts.

U.S. Pat. No. 3,821,122 discloses that the cloud points (i.e., the water solubility) of hydrolyzable silicone surfactants for conventional flexible polyurethane foam may be improved by forming an alkali salt of a sulfonic acid having 10 to 35 carbon atoms in situ in the surfactant during its preparation.

U.S. Pat. No. 3,669,913 discloses the use of a nonionic organic surfactant in combination with a nonhydrolyzable siloxane oxyalkylene surfactant in conventional flexible polyurethane foam.

U.S. Pat. No. 3,594,334 discloses the use of certain combinations of anionic organic surfactants (sulfonates and carboxylates) with siloxane-polyoxyalkylene copolymer surfactants for stabilization of flexible polyester urethane foams.

U.S. Pat. No. 3,562,786 discloses mixtures of cationic, anionic, nonionic or amphoteric organic surfactants with siloxane-oxyalkylene copolymer surfactants, the organic surfactants being employed to reduce the surface tension of aqueous solutions of surfactants used in applications such as wetting and foaming. The siloxane-oxyalkylene copolymer surfactants of the present invention are neither suggested by the extremely broad and general disclosure of the reference, nor shown by any of the examples, which illustrate surfactants having from 0 to a maximum of 20 dimethyl siloxy units in the siloxane. Use of the compositions of the reference in flexible polyurethane foams was apparently not contemplated.

German Patent 2615804, abstracted in Chemical Abstracts Vol. 88, 90441p, discloses mixtures of a siloxane-polyether and sulfonated castor oil used as stabilizers for polyurethane foams based on mixtures of polyether polyols and polyester polyols. The sulfonated castor oil was employed at a level of four times that of the siloxane-polyether surfactant.

Chemical Abstract Volume 87, No. 185851r discusses a composition containing 20% to 65% of a siloxane-polyoxyethylene block copolymer surfactant in combination with 10% to 25% of an anionic surfactant, for stabilization of ester polyurethanes.

Chemical Abstract Volume 109, No. 39033g, discloses the use of silicone surfactants in combination with organic surfactants for stabilization of polyester polyurethane foams.

The use of an amine carboxylate salt as a catalyst in polyester foam is taught in European patent application E.P. 63-930.

Although the art has recognized that organic surfactants and silicone surfactants may be used in specialized foams such as rigid foams or polyester foams, as discussed above, the presently claimed surfactant compositions for use in conventional flexible polyurethane foams have not been suggested.

SUMMARY OF THE INVENTION

The present invention provides a method for improving nonhydrolyzable silicone-polyether surfactants intended for use in conventional flexible polyurethane foam production, and improved surfactant compositions. The primary foam properties which are enhanced by this technology are foam height, foam porosity, and uniformity of foam cell structure.

The improved surfactant composition of the invention is a mixture comprising a) from about 99.98% to about 90% by weight of a "nonhydrolyzable" siloxane-polyether copolymer surfactant of the type suitable for use in conventional flexible polyurethane foam, this surfactant possessing a siloxane chain containing at least 26 silicon atoms exclusive of endcapping groups; and b) from about 0.02% to about 10% by weight of an organic acid salt having the general formula $A_aM_m$; the amounts recited above being based upon the sum of the siloxane-polyether copolymer surfactant and the organic acid salt. In the formula $A_aM_m$, A is an anionic organic moiety in which the organic portion contains at least 2 carbon atoms, preferably 2 to 25 carbon atoms, and the anionic portion is an anion selected from the group consisting of sulfonate, phosphate, phosphinate, phosphonate, and carboxylate; M is a cation selected from the group consisting of cations of the metals of groups Ia, IIa, and IIb of the periodic table, $R'_4N^+$, and $R'_4P^+$, wherein R' is alkyl of 1–18 carbon atoms or a phenyl-substituted alkyl group; the subscript a is a number corresponding to the charge of M, and the subscript m is a number corresponding to the charge on the anionic portion of A.

The method for improving a "non-hydrolyzable" siloxane-polyether copolymer surfactant with respect to its ability to stabilize a reacting flexible polyurethane foam composition and to facilitate production of high quality foam, comprises the step of adding to such surfactant a low level of an organic acid salt having the general formula $A_aM_m$ wherein A is an anionic organic moiety in which the organic portion contains at least 2 carbon atoms, preferably 2 to 25 carbon atoms, and the anionic portion is is an anion selected from the group consisting of sulfonate, phosphate, phosphinate, phosphonate, and carboxylate; M is a cation selected from the group consisting of cations of the metals of groups Ia, IIa, and IIb of the periodic table, R' N, and $R'_4P^+$, wherein R' is alkyl of 1–18 carbon atoms or a phenyl-substituted alkyl group; the subscript a is a number corresponding to the charge on M; and the subscript m is a number corresponding to the charge on the anionic portion of A. The organic acid salt is employed in the mixture of the surfactant and the organic acid salt in an amount from about 0.02% to about 10% by weight of the mixture.

DETAILED DESCRIPTION OF THE INVENTION

The siloxane-polyether copolymer surfactants with which the organic acid salts are employed are "nonhydrolyzable" silicone polyether copolymers of the sort used for conventional flexible polyurethane foam. In the following discussion, these materials will be referred to as the primary surfactants. In these materials, the polyether units are linked to the siloxane via Si-hydrocarbon-O linkages. Such surfactants and their methods of preparation are known to the art. More particularly, for purposes of the present invention the siloxane-polyether copolymer surfactants are silicone polyether copolymers in which the copolymer backbone possesses at least 26 Si—O—Si linkages, more than 50% of the Si atoms carry at least two methyl groups, and the sum of the atomic masses of the oxyethylene units and the oxypropylene units constitute at least 50% of the average molecular weight of the copolymer. These materials are described by the generalized formula I

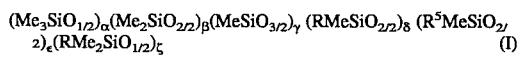
$(Me_3SiO_{1/2})_\alpha(Me_2SiO_{2/2})_\beta(MeSiO_{3/2})_\gamma (RMeSiO_{2/2})_\delta (R^5MeSiO_{2/2})_\epsilon(RMe_2SiO_{1/2})_\zeta$ (I)

wherein $\alpha+\zeta=\gamma+2$;

$\alpha=0$ to $(\gamma+2)$, preferably $\gamma+2$;

$\beta=25$ to 150, preferably 40 to 120, most preferably 50 to 100;

$\gamma=0$ to 15, preferably 0 to 3, most preferably 0;

$\delta=1$ to 40, preferably 4 to 15, most preferably 5 to 12;

$\epsilon=0$ to 20, preferably 0;

$\zeta=0$ to $(\gamma+2)$, preferably 0; and $\delta+\zeta\geq 4$.

In formula I, the sum of $\alpha$, $\beta$, $\gamma$, $\delta$, $\epsilon$ and $\zeta$ is greater than or equal to 26 but less than or equal to 200, preferably 45 to 125, most preferably 60 to 100.

The group R is $-(CHR')_nO(C_2H_4O)_x(C_2H_3R''O)_zQ$ or a mixture thereof, in which the average composition has n=2 to 10, preferably 3, and x+z=20 to 250, preferably 25 to 100.

The group R' is H, alkyl of 1 to 3 carbon atoms, phenyl, or alkyl-substituted phenyl in which the alkyl substituents contain 1 to 3 carbon atoms. R' is preferably H or alkyl of 1 to 3 carbon atoms, and most preferably H. The R' groups may be the same or different.

The group R" is alkyl of 1 to 18 carbon atoms, phenyl, or alkyl-substituted phenyl in which the alkyl substituents contain 1 to 4 carbon atoms, and is preferably methyl.

The group Q is selected from the group consisting of:

H;

alkyl of 1 to 18 carbon atoms;

benzyl;

alkyl-substituted benzyl in which the alkyl substituents contain 1 to 4 carbon atoms;

$-CO_2R^2$ in which $R^2$ is alkyl of 1 to 2 carbon atoms;

$-CONHR^3$ in which $R^3$ is alkyl of 1 to 3 carbon atoms, phenyl, or alkyl-substituted phenyl in which the alkyl substitutes contain 1 to 4 carbon atoms; and $-COR^4$ in which $R^4$ is alkyl of 1 to 4 carbon atoms, phenyl, or alkyl-substituted phenyl in which the alkyl substituents contain 1 to 4 carbon atoms.

Q is preferably alkyl of 1 to 4 carbon atoms or $COR^4$ in which $R^4$ is alkyl of 1 to 4 carbon atoms, and is most preferably methyl or acetoxy.

$R^5$ is alkyl of 2 to 18 carbon atoms, phenyl, phenyl-substituted alkyl of 2 to 3 carbon atoms, or cyano- or fluoro-substituted alkyl of 2 to 18 carbon atoms. It is most preferably alkyl of 2 to 18 carbon atoms.

Preferred primary surfactants are materials as generally described above, in which $\gamma=0$, $\epsilon=0$, the sum of $\alpha$, $\beta$, $\delta$, $\epsilon$, and $\zeta$ is greater than or equal to 45 but less than or equal to 125, and x+z in the average composition for the substituent R is 25 to 100.

Particularly preferred primary surfactants are materials as generally described above, in which $\gamma=0$, $\epsilon=0$, $\zeta=0$, $\delta=4$ to 40, and the sum of $\gamma$, $\beta$, and $\delta$ is greater than or equal to 60 but less than or equal to 100.

Particularly preferred surfactants falling within this definition comprise at least two polyether-containing materials of different molecular weights, one having at least 60% by weight of residues of ethylene oxide, and the other having at least 50% by weight of residues of propylene oxide.

Procedures for synthesizing siloxane-polyether copolymers having siloxane backbones and attached polyalkylene oxide groups are well known. Representative disclosures are provided in U.S. Pat. Nos. 4,147,847 and 4,855,379, relevant portions of which are hereby incorporated by reference.

Typically, the siloxane-polyether copolymer surfactants of the invention are prepared by causing a polyhydridosiloxane of generalized average formula $M^{}D_xD'_yM^{}$ to react with an appropriately chosen allyl-started oxyalkylene polymer or blend thereof in the presence of a hydrosilylation catalyst such as chloroplatinic acid. In the formula for the polyhydridosiloxane, $M^{**}$ is $(CH_3)_2(H)SiO_{1/2}$ or $(CH_3)_3SiO_{1/2}$, D is $(CH_3)_2SiO_{2/2}$, and D' represents $(CH_3)(H)SiO_{2/2}$. The allyl-started oxyalkylene polymers are polyethers having a terminal vinyl group, which may optionally be 2-substituted, and containing multiple units derived from ethylene oxide, propylene oxide, or both.

These reagents are mixed, either with or without a solvent, heated to about 70°–85 °C., then the hydrosilylation catalyst is added, a temperature rise of about 10°–15° C. is observed, and the mixture is finally sampled and analyzed for SiH groups by adding an alcohol and base and measuring evolved hydrogen. If a volatile solvent was used, this is removed under vacuum, and the mixture is generally neutralized with a weak base such as $NaHCO_3$, then filtered.

The polyhydridosiloxanes of generalized average formula $M^{}D_xD'_yM^{}$ are prepared in the manner known to the art. For the case in which $M^{}$ is $(CH_3)_3SiO_{1/2}$, an alkyldisiloxane such as hexamethyldisiloxane, a polyhydridosiloxane polymer, and an alkyl cyclosiloxane such as octamethylcyclotetrasiloxane are reacted in the presence of a strong acid such as sulfuric acid. For the case in which $M^{}$ is $(CH_3)_2(H)SiO_{2/2}$, a hydridoalkyldisiloxane such as dihydridotetramethyldisiloxane, a polyhydridosiloxane polymer, and an alkyl cyclosiloxane such as octamethylcyclotetrasiloxane are reacted in the presence of a strong acid such as sulfuric acid.

The allyl-started oxyalkylene polymers, also referred to as polyethers, are likewise prepared in the manner known to the art. An allyl alcohol, optionally bearing a substituent on the 2-position, is combined with ethylene oxide, propylene oxide, or both, in the presence of an acid or a base, to yield the desired polyether with a terminal hydroxyl group. This is typically capped by further reaction with an alkylating or acylating agent such as a methyl halide or acetic anhydride, respectively. Other end caps may of course be employed.

As explained above, the organic acid salt which is used in combination with the siloxane-polyether copolymer surfactant in the compositions of the invention is a material having the general formula $A_aM_m$. In this formula, A is an anionic organic moiety in which the organic portion contains at least 2 carbon atoms, preferably 2 to 25 carbon atoms, and most preferably 6 to 20 carbon atoms, and the anionic portion is an anion selected from the group consisting of sulfonate, phosphate, phosphinate, Phosphonate, and carboxylate.

More particularly, A is an organic moiety selected from the group consisting of i) organic sulfonates wherein the organic portion is alkyl of 2 to 25 carbon atoms, phenyl, or alkyl-substituted phenyl having at least one alkyl group of 1 to 18 carbon atoms, and the number of sulfonate groups is 1 to 3;

ii) organic carboxylates wherein the organic portion is alkyl of 2 to 25 carbon atoms, phenyl, or alkyl-substituted phenyl having at least one alkyl group of 1 to 18 carbon atoms, and the number of carboxylate groups is 1 to 3;

iii) organic phosphates wherein each organic group contains 4 to 25 carbon atoms;

iv) organic phosphinates wherein each organic group contains 4 to 25 carbon atoms; and v) organic phosphonates wherein organic groups attached to P contain 1 to 18 carbon atoms, and organic groups attached to O contain 4 to 18 carbon atoms.

Preferred anionic organic moieties are materials such as organic sulfonates and carboxylates, and the most preferred materials of this class are the alkyl benzene sulfonates.

M is a cation selected from the group consisting of cations of the metals of groups Ia, IIa, and IIb of the periodic table, $R'_4N^+$, and $R'_4P^+$, wherein R' is an alkyl group of 1–18 carbon atoms or a phenyl-substituted alkyl group. The subscript a is a number corresponding to the charge on M, and the subscript m is a number corresponding to the charge on A.

Preferred cations are the cations of group Ia metals, and the most preferred cations are those of sodium and potassium.

Illustrative of the organic sulfonate salts which are useful in the invention are alkyl benzene sulfonates such as dodecyl benzene sodium sulfonate, p-toluene sodium sulfonate, and sulfonated petroleum oils.

Illustrative of the organic carboxylate salts which are useful in the invention are the sodium or potassium salts of fatty acids such as oleic acid, stearic acid, linoleic acid, and palmitic acid, and dimers of unsaturated fatty acids.

Illustrative of the organic phosphate salts which are useful in the invention are dialkyl sodium or potassium phosphates such as dioctyl sodium phosphate, dicresyl sodium or potassium phosphate, and didodecyl sodium phosphate.

Illustrative of the organic phosphinate salts which are useful in the invention are alkyl phosphinates such as bis-(2,4,4-trimethylpentyl)phosphinic acid sodium salt.

Illustrative of the organic phosphonate salts which are useful in the invention are alkyl phosphonates such as octyl phosphonate.

The amount of organic acid salt to be employed in combination with a siloxane-polyether copolymer in forming the improved surfactant composition of the invention is generally from about 0.02% to about 10% by weight of the sum of these materials, preferably from about 0.05% to about 5% by weight of the sum of these materials, and most preferably from about 0.1% to about 2% by weight of the sum of these materials in the composition. As shown by the examples below, it is frequently satisfactory to employ the organic acid salt in an amount from about 0.2% to about 1% by weight of the sum of the weights of the surfactant and organic acid salt in the composition.

The improved surfactant composition of the invention may also include a diluent such as a mono-, di-, or triol of a polyether, a low molecular weight glycol, or a nonionic surfactant. This diluent has substantially no effect on the surfactant properties of the improved surfactant composition per se, but may be a material which is chemically reactive in the polyurethane foam composition in which the improved surfactant composition is ultimately used. Preferred diluents are materials such as polyethers containing ethylene oxide and propylene oxide units and at least one hydroxyl group.

Examples of suitable diluents are materials such as dipropylene glycol, ethoxylated nonyl phenols, and a butyl alcohol started polyether containing ethylene oxide and propylene oxide units and containing about 50% ethylene oxide units.

When employed, the diluent is used at a level of from about 1% to about 75% by weight of the composition of organic acid salt, siloxane-polyether surfactant, and diluent.

The improved surfactant composition of the invention may also include a siloxane-polyether copolymer cell opener material such as those disclosed in U.S. patent application Ser. No. 07/654,232, filed Feb. 12, 1991, which is hereby incorporated by reference. When such a cell opener material is used, it is employed in the composition at a level of from about 0.05% to about 40%, preferably from about 0.5% to about 25%, and most preferably from about 1% to about 20% by weight, based upon the weight of the primary surfactant in the composition. As the name implies, the cell opener material causes the polyurethane foam made with the surfactant composition to have a higher porosity than it would otherwise have, and may additionally improve the height of rise of the foam.

The mechanistic role of the anionic organic salt in flexible polyurethane foam surfactants is not known.

Many of the organic acid salts which are useful in this invention may be classified as organic surface active agents. The example to be shown below employing para-toluene sodium sulfonate, however, shows that the organic acid salt need not be surface active to be effective in improving the performance of siloxane-polyether surfactants. Those skilled in the art of anionic organic surfactants know that para-toluene sodium sulfonate is at least two orders of magnitude less surface active than dodecylbenzene sodium sulfonate, a known surfactant, and therefore does not qualify as an organic surfactant, because it lacks the hydrophobe needed for surfactancy.

The fact that favorable responses are realized when 0.4 wt % or less of the organic acid salt is added to the siloxane-polyether surfactant also suggests that the benefits are not simply the result of adding a second foam stabilizing surfactant. Typically 1% or less siloxane-polyether surfactant is used in the manufacture of flexible polyurethane foam. Thus, even if the organic acid salt were used in the siloxane-polyether copolymer surfactant at a level of 5% of the composition by weight, this would represent only 500 parts per million in the total polyurethane foam formulation. This concentration is much too low to evoke a co-surfactant effect.

Replacing the organic acid salt with equal or double the amount of a premium grade of siloxane-polyether surfactant does not produce the favorable results realized by use of the low levels of organic acid salts. This is unexpected because in most urethane foam applications silicone surfactants are more efficient in terms of achieving good heights of foam rise than organic surfactants.

Also, at least some of the salts (especially the sulfonates) are neutral enough that one would not anticipate any base-catalyzed chemistry involving the siloxane or the polyether portions of the siloxane-polyether surfactant. Similarly, one would not expect such organic acid salts to affect the chemistry of foam generation reactions, such as isocyanate trimerization, which could occur with bases such as alkali metal carboxylates, hydroxides, or alkoxides.

Typically the organic acid salt is introduced into the siloxane-polyether surfactant as an aqueous solution because it is commercially available in that form. In some cases the organic acid salt additive is available as a powder and is added in that form. Other carriers for the organic acid salt, such as polyethers or glycols, could also be used.

In most cases the siloxane-polyether copolymer surfactant and organic acid salt additive are fully soluble at the levels used and very little mixing is required. In no case was evidence found suggesting that high intensity mixing was important to the enhancement phenomenon.

It is preferred that the organic additive be fully soluble in the siloxane-polyether surfactant at the concentrations being used in the treatment, but it is not essential. In Example 14, in which relatively high levels of dodecylbenzene sodium sulfonate in water were added to the siloxane-polyether surfactant, the resulting mixture was hazy, yet the enhancement in foam performance was still realized. Some solubility is probably needed, but the degree of solubility required to give the desired improvement in foam performance will vary depending largely on the composition of the organic acid salt. Salts such as sodium acetate are not sufficiently soluble to give the desired enhancements. Because solubility of the organic acid salt depends on the nature of the anionic functional group, i.e. sulfonate, phosphate etc., as well as on the ratio of organic to inorganic substituents and the nature of the cation, i.e., whether it be sodium or tetramethylammonium, it is not possible to define precisely which features are necessary to give adequate solubility.

Generally the performance of the siloxane-polyether surfactants shown in the examples could be raised to their potential ceiling performance levels or close to these levels by mixing the organic acid salt and siloxane-polyether surfactant at room temperature and allowing the mixture to stand for at least one hour, and preferably for several hours. In some cases heating the mixture of components at about 60° C. to about 140° C., and preferably about 80° C. to about 120° C. for at least one hour and preferably for several hours gave improvements in performance above those seen at room temperature. Because the organic acid salts are generally available commercially as aqueous solutions, it is sometimes desirable to heat these systems to temperatures at which the water contents can be reduced to low levels during or following the treatment. Treatment temperatures as high as 120° C. gave surfactant compositions which provided the desired enhancement in foam properties. In these cases, there were no indications of any degradation of the surfactant properties upon extended heating.

The surfactant compositions of the invention are employed in the manufacture of polyurethane foam in the manner known to the art. A method for producing polyurethane foams includes reacting: (a) a polyol alone or in some instances in combination with other polymers with Zerewitinoff active hydrogen atoms, and (b) an organic polyisocyanate and optionally in the presence of (c) additives to produce the polyurethane product. When a foam is being prepared, these additives generally include catalyst, blowing agent (which may be water), crosslinkers, foam stabilizers, and foam softening agents such as Ortegol™ 300, Ortegol™ 310, Geolite™ GM-90, and Carapor™ 2001. The reaction and foaming operations can be performed in any suitable manner, preferably by the one-shot technique.

In producing the polyurethane foams using the surfactant compositions of this invention, one or more polyether polyols is employed for reaction with a polyisocyanate reactant to provide the urethane linkage. Such polyols have an average of at least slightly above 2 and typically 2.1 to 6 hydroxyl groups per molecule. They typically also include compounds which consist of carbon, hydrogen, and oxygen, and compounds which may also contain phosphorus, halogen, and/or nitrogen. Such polyether polyols are well known in the art and are commercially available.

Polyols useful in the preparation of polyurethane foams are polyether polyols (such as those described in U.S. Pat. No. 3,346,557), and polymer polyols (such as are described in U.S. Pat. Nos. Re. 28,715 and 29,118, 3,652,639, 3,823,201, 3,850,861, 4,454,255, 4,458,038, 4,550,194, 4,390,645 and 4,431,754).

The organic polyisocyanates that are useful in producing polyether polyurethane foams in accordance with the teachings of this invention are also well known in the art, and are organic compounds that contain at least two isocyanate groups. Any such compounds or mixtures thereof can be employed.

Suitable organic polyisocyanates include the hydrocarbon diisocyanates (e.g., the alkylene diisocyanates and the arylene diisocyanates), as well as known triisocyanates. Examples of suitable polyisocyanates are 2,4-diisocyanatotoluene, 2,6-diisocyanatotoluene (TDI), methylene bis(4-cyclohexyl isocyanate), isophorone diisocyanate, 1,2-diisocyanatoethane, 1,3-diisocyanatopropane, 1,2-diisocyanatopropane, 1,4-diisocyanatobutane, 1,5-diisocyanatopentane, 1,6-diisocyanatohexane, bis(3-isocyanatopropyl)ether, bis(3-isocyanatopropyl) sulfide, 1,7-diisocyanatoheptane, 1,5-diisocyanato-2,2-dimethylpentane, 1,6-diisocyanato-3-methoxyhexane, 1,8-diisocyanatooctane, 1,5-diisocyanato-2,2,4-trimethylpentane, 1,9-diisocyanatononane, 1,10-diisocyanatodecane, 1,4-diisocyantocylohexane and isomers thereof, 1,10-diisocyanatopropyl)ether of 1,4-butylene glycol, 1,11-diisocyanatoundecane, 1,12-diisocyanatododecane bis(isocyanatohexyl) sulfide, 3,5-diisocyanato-o-xylene, 4,6-diisocyanato-m-xylene, 2,6-diisocyanato-p-xylene, tetramethylxylylene diisocyanate, 2,4-diisocyanato-1-chlorobenzene, 2,4-diisocyanato-1-nitrobenzene, 2,5-diisocyanato-1-nitrobenzene, 2,4' and 4,4'-diphenyl methane diisocyanate (MDI), and derivatives thereof, 3,3-diphenylmethylene diisocyanate, and polymethylene poly(phenyleneisocyanates) as described in the literature and in many patents, for example, U.S. Pat. Nos. 2,683,730; 2,950,263; 3,012,008; 3,344,162; and 3,362,979, and mixtures thereof.

Additional aromatic polyisocyanates include p-phenylene diisocyanate, dianisidine diisocyanate, bitolylene diisocyanate, naphthalene-1,4-diisocyanate, bis(3-methyl-3-isocyanatophenyl)methane, bis(3-methyl-4-isocyanatophenyl)methane, and 4,4'-diphenylpropane diisocyanate.

The preferred polyisocyanate is toluene diisocyanate (TDI), a mixture of 80% 2,4-toluene diisocyanate and 20% 2,6-toluene diisocyanate. A mixture of 65% 2,4-toluene diisocyanate and 35% 2,6-toluene diisocyanate is also available.

The urethane foaming reaction is usually effected in the presence of a minor amount of a catalyst, preferably an amine catalyst and usually a tertiary amine.

It is also preferred to include a minor amount of certain metal catalysts in addition to the amine catalyst in the components of the reaction mixture. Such supplementary catalysts are well known to the art of polyether-based polyurethane foam manufacture. For example, useful metal catalysts include organic derivatives of tin, particularly tin compounds of octanoic acid.

Any known catalysts useful in producing polyurethane foams may be employed. Representative catalysts include: (a) tertiary amines such as bis(2,2'-dimethylamino)ethyl ether, trimethylamine, triethylamine, N-methylmorpholine, N-ethylmorpholine, N,N-dimethylbenzylamine, N,N-dimethylethanolamine, N,N,N',N'-tetramethyl-1,3-butanediamine, triethanolamine, 1,4-diazabicyclo-[2.2.2]octane, hexamethylenetetramine, pyridine oxide and the like; (b)

tertiary phosphines such as trialkylphosphines, dialkylbenzylphosphines, and the like; (c) strong bases such as alkali and alkaline earth metal hydroxides, alkoxides, and phenoxides; (d) acidic metal salts of strong acids such as ferric chloride, stannic chloride, stannous chloride, antimony trichloride, bismuth nitrate and chloride, and the like; (e) chelates of various metals such as those which can be obtained from acetylacetone, benzoylacetone, trifluoroacetylacetone, ethyl acetoacetate, salicylaldehyde, cyclopentanone-2-carboxylate, acetylacetoneimine, bis-acetylacetone-alkylenediimines, salicylaldehydeimine, and the like, with various metals such as Be, Mg, Zn, Cd, Pb, Ti, Zr, Sn, As, Bi, Cr, Mo, Mn, Fe, Co, Ni, or such ions as $MOO_2^{++}$, $UO_2^{++}$, and the like; (f) alcoholates and phenolates of various metals such as $Ti(OR)_4$, $Sn(OR)_4$, $Sn(OR)_2$, $Al(OR)_3$, and the like, wherein R is alkyl or aryl, and the reaction products of alcoholates with carboxylic acids, beta-diketones, and 2(N,N-dialkylamino)alkanols, such as the well-known chelates of titanium obtained by said or equivalent procedures; (g) salts of organic acids with a variety of metals such as alkali metals, alkaline earth metals, Al, Sn, Pb, Mn, Co, Bi, and Cu, including, for example, sodium acetate, potassium laurate, calcium hexanoate, stannous acetate, stannous octoate, stannous oleate, lead octoate, metallic driers such as manganese and cobalt naphthenate, and the like; and (h) organometallic derivatives of tetravalent tin, trivalent and pentavalent As, Sb, and Bi, and metal carbonyls of iron and cobalt.

Among the organotin compounds that deserve particular mention are dialkyltin salts of carboxylic acids, e.g., dibutyltin diacetate, dibutyltin dilaureate, dibutyltin maleate, dilauryltin diacetate, dioctyltin diacetate, dibutyltin-bis(4-methylaminobenzoate), dibutyltin-bis(6-methylaminocaproate), and the like. Similarly, there may be used a trialkyltin hydroxide, dialkyltin oxide, dialkyltin dialkoxide, or dialkyltin dichloride. Examples of these compounds include trimethyltin hydroxide, tributyltin hydroxide, trioctyltin hydroxide, dibutyltin oxide, dioctyltin oxide, dilauryltin oxide, dibutyltin-bis(isopropoxide) dibutyltin-bis(2-dimethylaminopentylate), dibutyltin dichloride, dioctyltin dichloride, and the like.

The tertiary amines may be used as primary catalysts for accelerating the reactive hydrogen/isocyanate reaction or as secondary catalysts in combination with one or more of the above-noted metal catalysts. Metal catalysts, or combinations of metal catalysts, may also be employed as the accelerating agents, without the use of amines. The catalysts are employed in small amounts, for example, from about 0.001 percent to about 5 percent, based on the weight of the reaction mixture.

Representative crosslinker examples include but are not limited to: glycol amines; diethanolamine, triethanolamine, monoethanolamine, methyldiethanolamine, isopropanolamine, 2-hydroxyethylpiperazine, aminoethylethanolamine, 2-aminoethanol, Quadrol®, amines; aminoethylpiperazine, p-phenylenediamine, m-phenylenediamine, diisopropanolamine, glycols; sorbitol, ethylene glycol, glycerine.

Blowing agents such as water are typically employed to generate carbon dioxide in situ. Additional blowing agents which are vaporized by the exotherm of the reaction are also commonly employed. Suitable blowing agents, for example, include generally, water from about 0.1 to about 10 weight percent, based upon total weight of polyol or other suitable blowing agents which are vaporized by the exotherm of the reaction, or a combination of water and the other blowing agent. Illustrative polyurethane blowing agents include halogenated hydrocarbons such as trichloromonofluoromethane, dichlorodifluoromethane, dichloromonofluoromethane, dichloromethane, trichloromethane, 1,1-dichloro-1-fluoroethane, 1,1,2-trichloro-1,2,2-trifluoroethane, hexafluorocyclobutane, octafluorocyclobutane, and the like. Another class of blowing agents include thermally unstable compounds which liberate gases upon heating such as N,N'-dimethyl-N,N'-dinitrosoterephthalamide, amine formates, formic acid, and the like. The generally preferred method of foaming for producing foams is the use of water, or a combination of water plus a fluorocarbon blowing agent such as trichloromonofluoromethane. The quantity of blowing agent employed will vary with factors such as the density desired in the foamed product.

Other additives may of course be employed to impart specific properties to the foam. Examples are materials such as flame retardants, pigments, antistatic agents, and processing aids.

The product polyether-based polyurethane foams of this invention may be formed in accordance with any of the processing techniques known to the art, such as, in particular, the "one shot" technique. In accordance with this method, foamed products are provided by carrying out the reaction of the polyisocyanate and polyether polyol simultaneously with the foaming operation. It is sometimes convenient to add the surfactant to the reaction mixture as a premixture with one or more of the blowing agents, polyether, polyol, and catalyst components.

It is to be understood that the relative amounts of the various components of the foam formulation are not narrowly critical. The polyether polyol and polyisocyanate are present in the foam-producing formulation in a major amount. The relative amounts of these two components in the mixture are well known to the art. The blowing agent, catalyst, and surfactant are each present in a minor amount sufficient to foam the reaction mixture. The catalyst is present in a catalytic amount, i.e., that amount necessary to catalyze the reactions to produce the urethane at a reasonable rate, and the surfactant is present in an amount sufficient to impart the properties desired.

In a typical preparation, the polyether polyol, surfactant composition, amine catalyst, and blowing agent are mixed together, then stannous octoate is added with stirring, and finally toluene diisocyanate is mixed in and the composition is allowed to foam and polymerize.

The foams of the present invention can be used with advantage in the manufacture of textile interliners, cushions, mattresses, padding, carpet underlay, packaging, gaskets, sealers, thermal insulators and the like. They are also advantageously used in flame retardant applications.

Definitions and Identifications of Materials

The following terms are employed herein as defined below. Various materials are also defined below for the convenience of the reader.

The term air flow refers to the volume of air which passes through a 0.5 inch thick 2 inch diameter circular section of foam at 0.5 inches of pressure. Units are expressed in standard cubic feet per minute. A representative commercial unit for measuring air flow is manufactured by Custom Scientific Instruments Inc., of Kearny, N.J. and identified as Nopco CS-145.

The polyethers employed in synthesizing the silicone-polyether copolymers are allyl-started materials which are distributions of various polyether species. The average numbers of alkylene oxide units are indicated by subscripts. The nominal molecular weight is the average m.w. of the species comprising the mixture.

Blend average molecular weight (BAMW) is the weighted average molecular weight of the mixture of polyethers employed in synthesizing the silicone-polyether copolymers, the weighting taking account of the relative amounts of materials in the mixture. The blend average molecular weight is the overall average atomic mass of the polyethers constituting the mixture. The term is also employed herein to refer to the polyethers in the silicon-polyether copolymers.

NIAX® Polyol 16-56 is a proprietary commercial product of the A C West Virginia Polyol Company.

In accordance with generally-accepted usage, the following symbols are defined as shown:

M refers to $(CH_3)_3SiO_{1/2}$;

M' refers to $(H)(CH_3)_2SiO_{1/2}$;

D refers to $(CH_3)_2SiO_{2/2}$;

D' refers to $(H)(CH_3)SiO_{2/2}$; and

D" refers to $R(CH_3)SiO_{2/2}$, where R is a polyether-containing group.

In this terminology, the numerator of the fraction relating to the oxygen atom(s) indicates the number of oxygen atoms attached to the silicon atom of the given unit, and the denominator refers to the number of silicon atoms to which the oxygen atom(s) bond.

The units of the siloxane are sometimes also written in a manner which does not indicate sharing of oxygen atoms, for convenience. For example, D is sometimes shown as $(CH_3)_2SiO$, or $Me_2SiO$. D" is sometimes shown as $R(CH_3)SiO$ or $R(Me)SiO$, and so forth. As indicated above, $CH_3$ is sometimes abbreviated as "Me". Thus, the hypothetical material

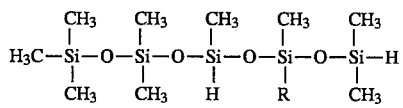

might be written as $Me_3SiO(Me_2)SiO(Me)(H)SiO(Me)(R)SiOSi(Me)_2H$ or as

MDD'D"M'

When a siloxane contains multiple units of a given type, the average number of these is indicated by a subscript in the formula. Such a subscript does not indicate such units are contiguous, and in fact they are not, except in special circumstances.

L-31 is a polyhydridomethylsiloxane polymer having the general formula $MD'_{45-60}M$.

Toluene diisocyanate (TDI) was a mixture of approximately 80% of the 2,4-isomer and 20% of the 2,6-isomer.

Niax® Catalyst A-200 is a proprietary product of Union Carbide Chemicals and Plastics Company, Inc.

DBSS stands for dodecylbenzene sodium sulfonate.

PTSS stands for para-toluene sodium sulfonate.

The sodium phosphinate of Example 24 was Bis-(2,4,4-trimethylpentyl)phosphinic acid, sodium salt.

As employed herein, the term pphp means parts per hundred of polyol.

In the following examples and tables, the structures of the SiH fluids are equilibrium distributions and are actually comprised of a minor amount of cyclic material and predominant amount of linear species. In the syntheses of the surfactants, the entire equilibrium distribution was used without removing the more volatile components, though it is possible to remove and recycle these volatiles. One of the endblockers used in these siloxane copolymers is MM, which frequently contains hydrocarbon impurities. The weights of charges employed in the various preparations refer to active components.

Similarly, the polyethers employed in the hydrosilylation reactions contain inactive components, primarily polyethers not containing allyl groups. When the blend average molecular weights and amounts of the polyethers are computed, it is necessary to compensate for the amounts of inactive components. In this work, whenever the polyether to be employed contained both ethylene oxide and propylene oxide units, a fixed ratio of ethylene oxide to propylene oxide was used throughout the preparative reaction.

The following examples illustrate the invention, and are not intended to be limiting.

Experimental Procedures

The procedures used for preparing the silicone-polyether copolymers were basically the same for all of the copolymers described in this invention and are essentially the same as those published in a number of patents.

In some of the examples shown in this application, the siloxane-polyether copolymer surfactant and the organic acid salt were premixed and allowed to stand at room temperature for at least one hour. In some cases the materials were premixed and heated at a temperature between 80° C. and 120° C. for 2–4 hours. Details are provided in the tables.

Preparation of SiH Fluids

To a 500 ml. round bottom flask equipped with a glass stirring rod with Teflon blade and an air-driven stirrer motor were charged the desired amounts of hexamethyldisiloxane (MM), octamethylcylotetrasiloxane ($D_4$), L-31, and sulfuric acid. The flask was stirred for 24 hours at ambient temperature. The flask contents were then slowly neutralized with an excess of dampened sodium bicarbonate. The product was treated with 0.5 wt % activated carbon and pressure filtered to give a colorless liquid which was characterized by SiH content and viscosity. The charges used for the preparations are shown in Table 1.

TABLE 1

Charges used for Preparation of SiH Fluids

| Product | MM(g) | Cyclic $D_4$(g) | L-31g | $H_2SO_4$(g) |
|---|---|---|---|---|
| Fluid A | 7.53 | 276 | 16.1 | 6.24 |
| Fluid B | 7.74 | 266 | 26.1 | 6.24 |

Preparation of Siloxane-Polyether Copolymers

A 500 ml. round bottom flask fitted with a glass stirring rod having a Teflon blade with an air-driven stirrer motor were charged with the desired polyether or blend of polyethers (using a 30 mole % excess), SiH fluid, and toluene. The flask was equipped with a thermometer, condenser, and a nitrogen sparge tube. The mixture was heated to about 80° C. with a slow nitrogen purge and then an ethanol solution of chloroplatinic acid (10 mg. Pt/ml.) was added to give 15 ppm of Pt. An exotherm of several degrees and a change from "cloudy" to "clear" were noted. After about one-half hour a sample of this material showed no residual SiH as determined by reaction with an ethanol solution of KOH in a fermentation tube. The material was neutralized with sodium bicarbonate and stripped at 125°/50 min. to remove toluene, then pressure filtered. The charges used for the preparations are shown in Table 2.

TABLE 2

Charges used for Preparation of Siloxane-Polyether Copolymers

| SiH Fluid | | Polyethers | | | |
| --- | --- | --- | --- | --- | --- |
| Designation | gms | Composition | gms | BAMW | Toluene |
| Fluid A. | 50.6 | P-1,P-3 | 149.6 | 2250 | 85.6 |
| Fluid B. | 51.8 | P-1,P-2 | 148.4 | 1300 | 85.6 |

P-1 = an allyl started, acetoxy capped polyether having a molecular weight of 4032, containing 37.1% ethylene oxide residues and 60.4% propylene oxide residues.
P-2 = an allyl started, acetoxy capped polyether having a molecular weight of 584, containing 82.9% ethylene oxide residues and 0.0% propylene oxide residues.
P-3 = an allyl started, acetoxy capped polyether having a molecular weight of 1498, containing 35.2% ethylene oxide residues and 58.1% propylene oxide residues.

Blends of Surfactants and Organic Acid Salts

The procedure for making the blends of surfactant and organic acid salts is not important, providing that minimum time requirements are met. The blends were prepared in an air atmosphere. Typically, the surfactant was charged to an open flask equipped with a Teflon blade and air-driven stirrer motor. To this was added the designated amount of organic acid salt. In the majority of the cases the organic acid salt (40%) was added as an aqueous solution. The resulting solution was stirred for the designated time (at least one hour). The temperatures were ambient, 80° C., 85° C., or 120° C. as indicated. The products were foam tested without further processing.

The surfactants were evaluated in the polyurethane foam formulation shown below in Table 3.

TABLE 3

Polyurethane Foam Test Formulation

| Material | pphp (wt.) |
| --- | --- |
| NIAX ® Polyol 16-56 | 100 |
| Distilled water | 5.5 |
| NIAX ® Catalyst A-200 | 0.2 |
| Methylene chloride | 10.0 |
| Stannous octoate | 0.23 |
| Toluene diisocyanate (TDI)[a] | 69.44 |
| Surfactant | varied |

Footnote for Table 3:
[a]The TDI was employed at a level of 112 percent of the stoichiometric amount.

Procedure for Preparation and Testing of Polyurethane Foams

The temperature of the laboratory, the polyol and TDI were noted. A 32 oz. paper cup was charged with NIAX Polyol 16-56 (250 g), the surfactant to be evaluated, amine/water premix (containing 13.75 g of water and 0.5 g of NIAX Catalyst A-200), and methylene chloride (25 g). The mixture was stirred for 15 seconds, then stirring was stopped. After 20 seconds total elapsed time stannous octoate (0.575 g, 0.46 ml) was added to the reaction mixture. Stirring was started and the mixture was stirred for 8 seconds before adding 80/20 toluene diisocyanate (173.6 g, 112% of the stoichiometric amount) with continuous stirring for an additional seven seconds. The stirrer was then stopped and the reaction mixture was dumped into a five gallon plastic bucket. The maximum height of the foam at blowoff, the amount of top collapse at constant rise on the strip chart via an ultrasonic depth monitor, and the rise time were recorded. The foam was then cured, typically for about 10–15 minutes at 120° C. to 125° C. A core sample was cut from the center of the foam. The core sample was sliced into ½ inch thick specimens. The specimen between 3.5 and 4.0 inches from the bottom of the foam was used to determine the breathability (airflow volume through a 2-inch diameter circular cross section at 0.5 inches pressure). Foam height was defined as the resulting height of the foam after the initial top collapse.

It should be borne in mind that with some of these types of surfactants, if too high a level of surfactant is used in the foam preparation, air flows suffer. The optimum amount of surfactant is that which gives the best combination of height of rise and air flow.

Results of tests on foams prepared using various preparations of siloxane-polyether copolymer surfactants and organic acid salts are reported in Tables 4 and 5 below. In these tables, the amounts of the organic acid salt additives are given as a percentage of the total mixture of siloxane-polyether surfactant, organic acid salt, and any water; the test concentrations are the amounts of the surfactant compositions used in the foams, expressed as parts per hundred of polyol; and air flows of the resulting test foams are given in units of standard cubic feet per minute.

For each type of siloxane-polyether copolymer surfactant, several preparations of surfactant material were tested. Siloxane polyethers referred to as Type A and Type B in the following text are based on the SiH fluids described in Table 1 and were prepared using the reagents shown in Table 2. The numbers shown in the left-most column refer to exemplary experimental runs. For the surfactant of type B, generally acceptable performance in the test foam formulation would give a rise height of at least 36 cm, and an air flow of at least 4 scfm. Such results do not indicate optimum performance, however.

TABLE 4

Siloxane-Polyether Type A

| | Temp | Test | Foam Properties | |
| --- | --- | --- | --- | --- |
| Additive | Time | Conc. | Rise(cm) | Air Flow |
| Preparation #1 | | | | |
| 1. None(control) | | 0.6 | 37.7 | 6.1 |
| 2. 0.4% DBSS 0.6% Water | 80° C./6 hr. | 0.6 | 38.2 | 6.8 |
| Preparation #2 | | | | |
| 3. None(control) | | 0.6 | 37.4 | 6.8 |
| 4. 0.4% DBSS 0.6% Water | r.t./24 hr. | 0.6 | 38.0 | 7.4 |

The results given in Table 4 show that addition of DBSS to each of two preparations of a siloxane-polyether surfactant at a level of 0.4% by weight of the surfactant composition improves its performance in polyurethane foam manufacture, and that for this surfactant it does not seem to matter if the surfactant composition containing the additive is heated or not. Each preparation gave acceptable performance, but the performance of each was improved by addition of organic acid salt.

TABLE 5

Siloxane-Polyether Surfactant Type B

| | Temp | Test | Foam Properties | |
| --- | --- | --- | --- | --- |
| Additive | Time | Conc. | Rise(cm) | Air Flow |
| Preparation #1 | | | | |
| 5. None(control) | | 0.6 | 35.0 | 2.3[a] |
| 6. 0.4% DBSS 0.6% Water | rt/15 min | 0.6 | 37.4 | 3.1[b] |
| 7. 0.4% DBSS | rt/24 hr. | 0.6 | 37.8 | 4.8[c] |

TABLE 5-continued

| | Siloxane-Polyether Surfactant Type B | | | |
|---|---|---|---|---|
| | | Temp | Test | Foam Properties |
| Additive | | Time | Conc. | Rise(cm) Air Flow |
| 8. 0.6% Water 0.4% DBSS 0.6% Water | | rt/72 hr. | 0.6 | 38.5  4.9[d] |
| 9. 0.4% DBSS 0.6% Water | | 85° C./4 hr. | 0.6 | 39.2  5.0 |
| 10. 0.4% DBSS 0.6% Water | | 120° C./1 hr. | 0.6 | 38.8  4.8 |
| 11. 0.2% DBSS 0.3% Water | | 85° C./1 hr. | 0.6 | 39.4  5.0 |
| 12. 0.4% DBSS 0.6% Water | | 85° C./1 hr. | 0.6 | 37.4  4.5 |
| 13. 0.8% DBSS 1.2% Water | | 85° C./1 hr. | 0.6 | 38.4  4.6 |
| 14. 1.6% DBSS 2.4% Water | | 85° C./1 hr. | 0.6 | 38.2  5.0 |
| 15. 0.4% PTSS | | 85° C./2 hr. | 0.6 | 39.4  4.4 |
| Preparation #2 | | | | |
| 16. None(control) | | | 0.6 | 37.4  4.7 |
| 17. 0.4% DBSS 0.6% Water | | 85° C./4 hr. | 0.6 | 38.2  5.0 |
| Preparation #3 | | | | |
| 18. None(control) | | | 0.6 | 35.5  3.3 |
| 19. 0.4% DBSS 0.6% Water | | 85° C./4 hr. | 0.6 | 38.2  4.7 |
| 20. 0.4% Potassium oleate 0.6% Water | | 85° C./7 hr. | 0.6 | 38.4  5.6 |
| Preparation #4 | | | | |
| 21. None(control) | | | 0.6 | 37.4  6.0 |
| 22. 0.4% DBSS 0.6% Water | | 80° C./6 hr. | 0.6 | 37.9  7.5 |
| Preparation #5 | | | | |
| 23. None(control) | | | 1.4 | 32.2  (a) |
| 24. Sodium Phosphinate | | 85° C./4 hr. | 1.4 | 37.4  2.4 |
| Preparation #6 | | | | |
| 25. None(control) | | | 0.5 | 34.8  3.4[b] |
| 26. 0.4% DBSS 0.6% Water | | r.t./92 hr. | 0.5 | 37.4  3.8[c] |
| 27. 0.4% DBSS 0.6% Water | | 120° C./4 hr. | 0.5 | 37.6  5.3 |

Footnotes for Table 5:
[a]Voids in foam prevented an air flow determination.
[b]Splits in top of foam and large internal voids.
[c]Splits in top of foam.
[d]No top splits or internal voids.

In Table 5, Example 6 shows that 15 minutes after addition of the organic acid salt the performance of the surfactant in foam production has improved substantially, and Example 7 shows that 24 hours after mixing, the surfactant performance has improved further, particularly in terms of providing foam having good air flow (porosity or breathability). Example 8 shows that further aging affords only minimal additional improvements.

Examples 9–10 show that heating the surfactant composition appears to improve the height of rise somewhat relative to the treated surfactant used without heating. Examples 11–13 show that the amount of additive employed does not appear to have a substantial effect on performance of the surfactant composition, but that heating the composition at 85° C. for as little as one hour provides substantially the same results as heating at higher temperatures or for longer times. Example 15 shows that addition of an organic acid salt which is not an organic surfactant also serves to improve the performance of the test surfactant.

Example 17 shows that when the unmodified surfactant is close to its performance ceiling, addition of an organic acid salt affords a relatively modest improvement in performance.

Examples 19 and 20 show that the addition of the carboxylate-containing organic acid salt potassium oleate to a surfactant results in improved performance similar to that achieved using DBSS, though a direct comparison is impossible since the compositions were heated for different times. Both improve the height of rise and the breathability of the resultant foam substantially.

Example 22 shows that DBSS-modified surfactant improved the performance of a surfactant which initially performed reasonably well. Heating in this instance was at a slightly lower temperature than in other runs, but this is not considered to have had a significant effect on the results.

Example 24 shows that use of the listed sodium phosphinate improved both the height of rise and the cell structure of the resultant foam, relative to foam produced from a poor-performing unmodified surfactant.

Examples 26 and 27 show that while adding the organic acid salt to the surfactant without heating the composition will improve the surfactant's performance, heating the modified surfactant composition can improve the height of rise and the breathability further.

We claim:
1. A composition which is a mixture comprising:
   a) from about 99.98% to about 90% by weight of a "nonhydrolyzable" siloxane-polyether copolymer surfactant of the type suitable for use in conventional flexible polyurethane foam, said surfactant possessing a siloxane chain containing at least 26 silicon atoms exclusive of endcapping groups; and
   b) from about 0.02% to about 10% by weight of an organic acid salt having the general formula $A_aM_m$, the amounts recited above being based upon the sum of the siloxane-polyether copolymer surfactant and the organic acid salt, wherein:

A is an anionic organic moiety in which the organic portion contains at least 2 carbon atoms, and the anionic portion is an anion selected from the group consisting of sulfonate, phosphate, phosphinate, phosphonate, and carboxylate;

M is a cation selected from the group consisting of cations of the metals of groups Ia, IIa, and IIb of the periodic table, $R'_4N^+$, and $R'_4P^+$, wherein $R'$ is alkyl of 1–18 carbon atoms or a phenyl-substituted alkyl group;

a is a number corresponding to the charge of M; and
   m is a number corresponding to the charge on the anionic portion of A.

2. The composition of claim 1 wherein said siloxane-polyether copolymer surfactant has the nominal general formula $$(Me_3SiO_{1/2})_\alpha(Me_2SiO_{2/2})_\beta(MeSiO_{3/2})_\gamma(RMeSiO_{2/2})_\delta(R^5MeSiO_{2/2})_\epsilon(RMe_2SiO_{1/2})_\zeta \quad (I)$$

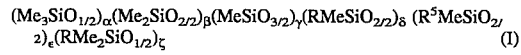

wherein
$\alpha+\zeta=\gamma+2$;
$\alpha=0$ to $(\gamma+2)$;
$\beta=25$ to 150;
$\gamma=0$ to 15;
$\delta=1$ to 40;
$\epsilon=0$ to 20;

$\zeta=0$ to $(\gamma+2)$; and $\delta+\zeta\geq 4$;

the sum of $\alpha$, $\beta$, $\gamma$, $\delta$, $\epsilon$ and $\zeta$ being greater than or equal to 26 but less than or equal to 200; and R is $-(CHR')_nO(C_2H_4O)_x(C_2H_3R''O)_zQ$ or a mixture thereof, in which the average composition has n=2 to 10; and x+z=20 to 250;

R' is H, alkyl of 1 to 3 carbon atoms, phenyl, or alkyl-substituted phenyl in which the alkyl substituents contain 1 to 3 carbon atoms, and where there are several R' groups, these may be the same or different;

R" is alkyl of 1 to 18 carbon atoms, phenyl, or alkyl-substituted phenyl in which the alkyl substituents contain 1 to 4 carbon atoms;

Q is selected from the group consisting of:

H;

alkyl of 1 to 18 carbon atoms; benzyl;

alkyl-substituted benzyl in which the alkyl substituents contain 1 to 4 carbon atoms;

$-CO_2R^2$ in which $R^2$ is alkyl of 1 to 2 carbon atoms;

$-CONHR^3$ in which $R^3$ is alkyl of 1 to 3 carbon atoms, phenyl, or alkyl-substituted phenyl in which the alkyl substitutes contain 1 to 4 carbon atoms; and $-COR^4$ in which $R^4$ is alkyl of 1 to 4 carbon atoms, phenyl, or alkyl-substituted phenyl in which the alkyl substituents contain 1 to 4 carbon atoms; and $R^5$ is alkyl of 2 to 18 carbon atoms, phenyl, phenyl-substituted alkyl of 2 to 3 carbon atoms, or cyano- or fluoro-substituted alkyl of 2 to 18 carbon atoms.

3. The composition of claim 2 wherein said siloxane-polyether copolymer surfactant has the nominal general formula I wherein $\gamma=0$, $\epsilon=0$, the sum of $\alpha$, $\beta$, $\delta$, $\epsilon$, and $\zeta$ is greater than or equal to 45 but less than or equal to 125, and x+z in the average composition for the substituent R is 25 to 100.

4. The composition of claim 2 wherein said siloxane-polyether copolymer surfactant has the nominal general formula I wherein $\gamma=0$, $\epsilon=0$, $\zeta=0$, $\delta=4$ to 40, and the sum of $\gamma$, $\beta$, and $\delta$ is greater than or equal to 60 but less than or equal to 100.

5. The composition of claim 1 wherein said siloxane-polyether copolymer surfactant comprises at least two polyether-containing materials of different molecular weights, one having at least 60% by weight of residues of ethylene oxide, and the other having at least 50% by weight of residues of propylene oxide.

6. The composition of claim 1 wherein said organic acid salt is selected from the group consisting of dodecylbenzene sodium sulfonate, para-toluene sodium sulfonate, potassium oleate, and bis-(2,4,4-trimethylpentyl)phosphinic acid sodium salt.

7. The composition of claim 1 wherein said organic acid salt is dodecylbenzene sodium sulfonate.

8. The composition of claim 1 wherein said siloxane-polyether copolymer surfactant is employed in said composition at a level of from about 99.95% to about 95% by weight, and said organic acid salt is employed in said composition at a level of from about 0.05% to about 5% by weight, these amounts being based on the sum of the weights of the surfactant and the organic acid salt in the composition.

9. The composition of claim 1 wherein the mixture of said siloxane-polyether surfactant and said organic acid salt has been aged for a period of at least one hour.

10. The composition of claim 1 wherein the mixture of said siloxane-polyether surfactant and said organic acid salt has been heated.

11. The composition of claim 10 wherein the temperature of heating is between 60° C. and 140° C.

12. The composition of claim 1 further comprising a diluent.

13. The composition of claim 12 wherein said diluent is an ether-containing material.

14. A method for improving a "non-hydrolyzable" siloxane-polyether copolymer surfactant with respect to its ability to stabilize a reacting polyurethane foam composition and to facilitate production of high quality foam, comprising the step of:

adding to said surfactant an organic acid salt having the general formula $A_aM_m$ wherein:

A is an anionic organic moiety in which the organic portion contains at least 2 carbon atoms, and the anionic portion is an anion selected from the group consisting of sulfonate, phosphate, phosphinate, phosphonate, and carboxylate;

M is a cation selected from the group consisting of cations of the metals of groups Ia, IIa, and IIb of the periodic table, $R'_4N^+$, and $R'_4P^+$, wherein R' is alkyl of 1–18 carbon atoms or a phenyl-substituted alkyl group;

a is a number corresponding to the charge on M; and m is a number corresponding to the charge on the anionic portion of A;

said organic acid salt being employed in the resulting mixture of said surfactant and said organic acid salt in an amount from about 0.02% to about 10% by weight of said mixture.

15. The method of claim 14 wherein said "non-hydrolyzable" siloxane-polyether copolymer surfactant has the nominal general formula $(Me_3SiO_{1/2})_\alpha(Me_2SiO_{2/2})_\beta(MeSiO_{3/2})_\gamma(RMeSiO_{2/2})_\delta (R^5MeSiO_{2/2})_\epsilon(RMe_2SiO_{1/2})_\zeta$ 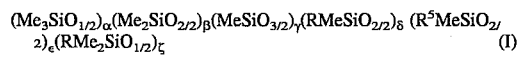 (I)

wherein $\alpha+\zeta=\gamma+2$;

$\alpha=0$ to $(\gamma+2)$;

$\beta=25$ to 150;

$\gamma=0$ to 15;

$\delta=1$ to 40;

$\epsilon=0$ to 20;

$\zeta=0$ to $(\gamma+2)$; and $\delta+\zeta\geq 4$;

the sum of $\alpha$, $\beta$, $\gamma$, $\delta$, $\epsilon$ and $\zeta$ being greater than or equal to 26 but less than or equal to 200; and R is $-(CHR')_nO(C_2H_4O)_x(C_2H_3R''O)_zQ$ or a mixture thereof, in which the average composition has n=2 to 10; and x+z=20 to 250;

R' is H, alkyl of 1 to 3 carbon atoms, phenyl, or alkyl-substituted phenyl in which the alkyl substituents contain 1 to 3 carbon atoms, and where there are several R' groups, these may be the same or different;

R" is alkyl of 1 to 18 carbon atoms, phenyl, or alkyl-substituted phenyl in which the alkyl substituents contain 1 to 4 carbon atoms;

Q is selected from the group consisting of:

H;

alkyl of 1 to 18 carbon atoms;

benzyl;

alkyl-substituted benzyl in which the alkyl substituents contain 1 to 4 carbon atoms;

—$CO_2R^2$ in which $R^2$ is alkyl of 1 to 2 carbon atoms;

—$CONHR^3$ in which $R^3$ is alkyl of 1 to 3 carbon atoms, phenyl, or alkyl-substituted phenyl in which the alkyl substitutes contain 1 to 4 carbon atoms; and —$COR^4$ in which $R^4$ is alkyl of 1 to 4 carbon atoms, phenyl, or alkyl-substituted phenyl in which the alkyl substituents contain 1 to 4 carbon atoms; and $R^5$ is alkyl of 2 to 18 carbon atoms, phenyl, phenyl-substituted alkyl of 2 to 3 carbon atoms, or cyano- or fluoro-substituted alkyl of 2 to 18 carbon atoms.

16. The method of claim 15 wherein said "non-hydrolyzable" siloxane-polyether copolymer surfactant has the nominal general formula I wherein $\gamma=0$, $\epsilon=0$, the sum of $\alpha$, $\beta$, $\delta$, $\epsilon$, and $\zeta$ is greater than or equal to 45 but less than or equal to 125, and x+z in the average composition for the substituent R is 25 to 100.

17. The method of claim 15 wherein said "non-hydrolyzable" siloxane-polyether copolymer surfactant has the nominal general formula I wherein $\gamma=0$, $\epsilon=0$, $\zeta=0$, $\delta=4$ to 40, and the sum of $\gamma$, $\beta$, and $\delta$ is greater than or equal to 60 but less than or equal to 100.

18. The method of claim 14 wherein said "non-hydrolyzable" siloxane-polyether copolymer surfactant comprises at least two polyether-containing materials of different molecular weights, one having at least 60% by weight of residues of ethylene oxide, and the other having at least 50% by weight of residues of propylene oxide.

19. The method of claim 14 wherein said organic acid salt is selected from the group consisting of dodecylbenzene sodium sulfonate, para-toluene sodium sulfonate, potassium oleate, and bis-(2,4,4-trimethylpentyl)phosphinic acid sodium salt.

20. The method of claim 14 wherein said organic acid salt is dodecylbenzene sodium sulfonate.

21. The method of claim 14 wherein said siloxane-polyether copolymer surfactant is employed in the mixture of said surfactant and said organic acid salt at a level of from about 99.95% to about 95% by weight, and said organic acid salt is employed in the mixture at a level of from about 0.05% to about 5% by weight, these amounts being based on the sum of the weights of the surfactant and the organic acid salt in the composition.

22. The method of claim 14 wherein the mixture of said siloxane-polyether surfactant and said organic acid salt has been aged for a period of at least one hour.

23. The method of claim 14 wherein the mixture of said siloxane-polyether surfactant and said organic acid salt has been heated.

24. The method of claim 23 wherein the temperature of heating is between 60° C. and 140° C.

25. The method of claim 14 further comprising adding a diluent to said surfactant.

26. The method of claim 25 wherein said diluent is an ether-containing material.

\* \* \* \* \*